United States Patent

Mueller et al.

[11] Patent Number: 5,900,098
[45] Date of Patent: May 4, 1999

[54] METHODS FOR BONDING STRUCTURALLY DISSIMILAR OPTICAL DISCS

[75] Inventors: William R. Mueller, Clarks Summit; Lewis R. Gensel, Avoca; Edward Pickutoski, Olyphant, all of Pa.

[73] Assignee: WEA Manufacturing Inc., Olyphant, Pa.

[21] Appl. No.: 08/944,148

[22] Filed: Oct. 6, 1997

Related U.S. Application Data

[60] Provisional application No. 60/028,356, Oct. 11, 1996.

[51] Int. Cl.$^6$ ...................................................... B32B 31/28
[52] U.S. Cl. ........................ 156/275.7; 369/283; 369/286
[58] Field of Search ............................ 156/272.2, 275.5, 156/275.7; 369/273, 274, 283, 284, 286

[56] References Cited

U.S. PATENT DOCUMENTS

| | | |
|---|---|---|
| 4,629,668 | 12/1986 | Hamersley et al. . |
| 4,972,404 | 11/1990 | Yamaguchi et al. . |
| 5,068,846 | 11/1991 | Kramer . |
| 5,138,604 | 8/1992 | Umeda et al. . |
| 5,470,627 | 11/1995 | Lee et al. . |
| 5,759,332 | 6/1998 | Itoigawa et al. ................. 156/275.7 X |
| 5,779,855 | 7/1998 | Amo et al. ........................ 156/275.7 X |

FOREIGN PATENT DOCUMENTS

| | | |
|---|---|---|
| 0063439 A1 | 10/1982 | European Pat. Off. . |
| 0437223 A2 | 7/1991 | European Pat. Off. . |
| 0517490 A2 | 12/1992 | European Pat. Off. . |
| 0598575 A2 | 5/1994 | European Pat. Off. . |
| 0704843 A1 | 4/1996 | European Pat. Off. . |
| 0706178 A2 | 4/1996 | European Pat. Off. . |
| 27 10443 | 3/1995 | France . |
| 62-280006 | 4/1987 | Japan . |
| 63-160034 | 2/1988 | Japan . |
| 2-021438 | 1/1990 | Japan . |
| 2-040146 | 8/1990 | Japan . |
| 7-201083 | 8/1995 | Japan ............................... G11B 7/26 |
| 9-128823 | 5/1997 | Japan . |

*Primary Examiner*—Jeff H. Aftergut
*Assistant Examiner*—Shawn A. Mitchell
*Attorney, Agent, or Firm*—Fish & Neave; Robert R. Jackson; Walter M. Egbert, III

[57] ABSTRACT

Methods for bonding structurally asymmetrical or otherwise structurally dissimilar optical discs are provided. A bonded optical disc stack is formed from a first and a second optical disc by coating the back side of at least one of the optical discs with a light-curable bonding material and stacking the first and second optical discs back to back. The front side of the second optical disc is exposed to light for a first predetermined time period. The front sides of both the first and second optical discs are then exposed to light for a second predetermined time period. Finally, the front side of the first optical disc is exposed to light for a third predetermined time period. In this manner, when the second optical disc comprises program information and the first optical disc comprises a graphical image or other artwork, image passthrough due to simultaneous exposure and disc warpage due to one-sided exposure are significantly reduced.

8 Claims, 4 Drawing Sheets

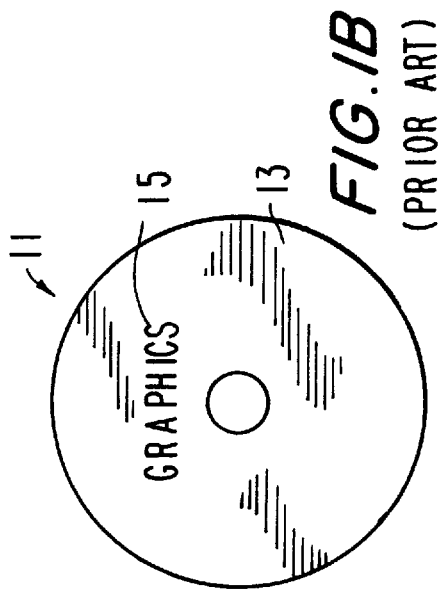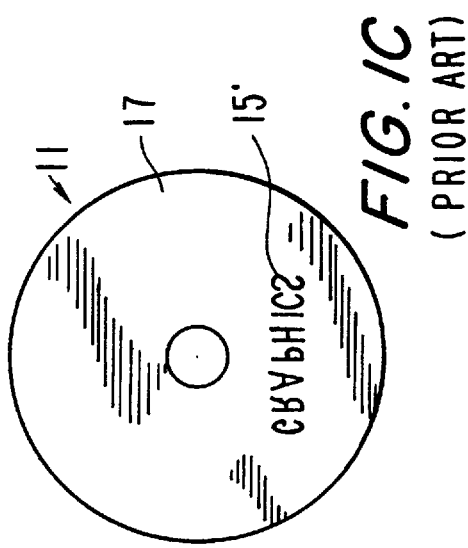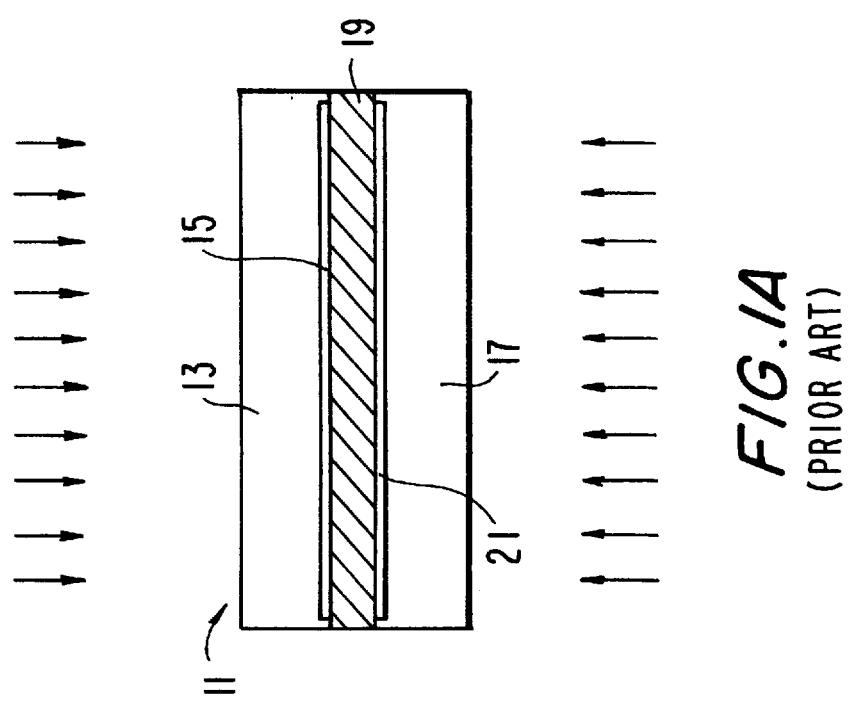

METHODS FOR BONDING STRUCTURALLY DISSIMILAR OPTICAL DISCS

This application claims the benefit of U.S. provisional application No. 60/028,356, filed Oct. 11, 1996.

BACKGROUND OF THE INVENTION

This invention relates to information recording media in the form of light-readable discs, and more particularly to such media which are made up of two such discs secured to one another back to back to form a two-sided stack.

Light-readable information recording media in the form of discs are well known as shown, for example, by Kramer U.S. Pat. No. 5,068,846. Commercially available compact discs ("CDs") and compact disc read-only memories ("CD-ROMs") are examples of recording media of this general type.

More recently, digital versatile discs ("DVDs") have emerged wherein light-readable information technology is employed to record movies and other similar real-time audio/visual programming (hereinafter "program information") on discs. To increase program information storage capacity, DVDs are formed from two discs (similar in appearance to conventional audio CDs) bonded back to back (see, for example, U.S. Pat. No. 5,729,533, issued Mar. 17, 1998, the entire contents of which are hereby incorporated by reference). Bonding of the two discs is normally performed by coating each disc's back side (i.e., the side of a disc which is bonded to another disc) with a light-curable bonding material, stacking the discs back to back, and curing the bonding material by simultaneously exposing each disc's front side to ultra-violet light. This bonding technique is commonly referred to as "simultaneous exposure."

When the two discs forming a DVD are structurally symmetrical or otherwise structurally similar (e.g., both discs contain program information), the transmissivity of each disc is also similar. Accordingly, light of approximately the same characteristics (e.g., wavelength and intensity) may be used to expose each disc during simultaneous exposure. However, when the discs to be bonded are structurally asymmetrical or otherwise structurally dissimilar (e.g., one disc contains program information and the other disc contains printed images or other artwork), the transmissivity of each disc may differ greatly. As a consequence, during the simultaneous exposure of a DVD formed with structurally asymmetrical or structurally dissimilar discs (hereinafter "an asymmetrical DVD"), unequal amounts of light reach the bonding material through each disc (assuming a similar light source is used to expose each disc). For example, when a disc contains a printed image, the characteristics of light transmitted through the disc vary with the transmissivity variations inherent in the printed image (e.g., due to ink thickness or color variations). By curing through such an image, the underlying bonding material will be cured non-uniformly and in a manner related to the spatial transmissivity variations present in the printed image. In such a case, an image closely resembling the original printed image (e.g., a mirror image of the original image) may be visible through a program information disc bonded to the printed image disc. This type of bleed-through phenomenon is referred to as "image pass-through." In addition to producing an unattractive mirror image of the original printed image, the non-uniformly cured bonding material responsible for image pass-through may actually degrade DVD playability.

One technique for reducing image pass-through in an asymmetrical DVD is to cure the light-curable bonding material by exposing only the program information side of the DVD to light (commonly referred to as "one-sided exposure"). In this manner, the spatial transmissivity variations present in the printed image have no effect on the curing process, and image pass-through is eliminated. Unfortunately, a one-sided exposure also results in non-uniform curing of the bonding material as bonding material proximate the disc being exposed to light is cured more rapidly than bonding material distal the exposed disc. Because bonding material expands during the curing process, bonding material receiving more light (e.g., the bonding material proximate the exposed disc) expands more rapidly than bonding material receiving less light (e.g., the remaining bonding material). This non-uniform bonding material expansion strains the bonding material and the discs of the DVD and causes the DVD to warp or tilt. Thereafter, the warped/tilted DVD will not play properly. This problem is exacerbated by the non-uniform infrared heating associated with the curing process.

A need therefore exists for methods for bonding structurally asymmetrical or otherwise structurally dissimilar optical discs which minimize both disc tilt and image pass-through. Such methods will allow a program information disc to be bonded to a graphical image disc without experiencing the drawbacks associated with either phenomenon.

In view of the foregoing, it is an object of this invention to provide methods for bonding structurally asymmetrical or otherwise structurally dissimilar optical discs which reduce both disc tilt and image pass-through.

SUMMARY OF THE INVENTION

This and other objects of the invention are accomplished in accordance with the principles of the invention by providing methods for reducing both disc tilt and image pass-through in structurally asymmetrical and otherwise structurally dissimilar optical disc stacks.

A DVD is formed from a first and a second optical disc by coating the back side of at least one of the optical discs with a light-curable bonding material and stacking the first and second optical discs back to back. Preferably, the second disc comprises program information, while the first disc comprises some form of artwork. To cure the light-curable bonding material without suffering detrimental effects from disc tilt and image pass-through, a three step curing process is employed.

The front side of the second optical disc is exposed to light for a first predetermined time period. This first exposure partially cures the light-curable bonding material, making it much less susceptible to image pass-through. The DVD may warp slightly as a result of this one-sided exposure.

Following the one-sided exposure of the second optical disc, the front sides of both the first optical disc and the second optical disc are simultaneously exposed to light for a second predetermined time period. Because the light-curable bonding material is partially cured during the first exposure, the second exposure cures the light-curable bonding material without producing image pass-through.

Finally, the front side of the first optical disc is exposed to light for a third predetermined time period. This third exposure completes the curing of the light-curable bonding material and reduces disc tilt within the DVD through expansion of bonding material proximate the back side of the first optical disc. In this manner, any disc warpage produced during the first exposure is reduced or eliminated during the third exposure. Thus, an asymmetrical DVD is formed without suffering from disc tilt or image pass-through.

Further features of the invention, its nature and various advantages will be more apparent from the accompanying drawings and the following detailed description of the preferred embodiments.

BRIEF DESCRIPTION OF THE DRAWINGS

FIG. 1A is a cross-sectional representation of a DVD formed via simultaneous exposure;

FIG. 1B is a top view of the DVD of FIG. 1A;

FIG. 1C is a bottom view of the DVD of FIG. 1A;

DETAILED DESCRIPTION OF THE PREFERRED EMBODIMENTS

Figure 2:
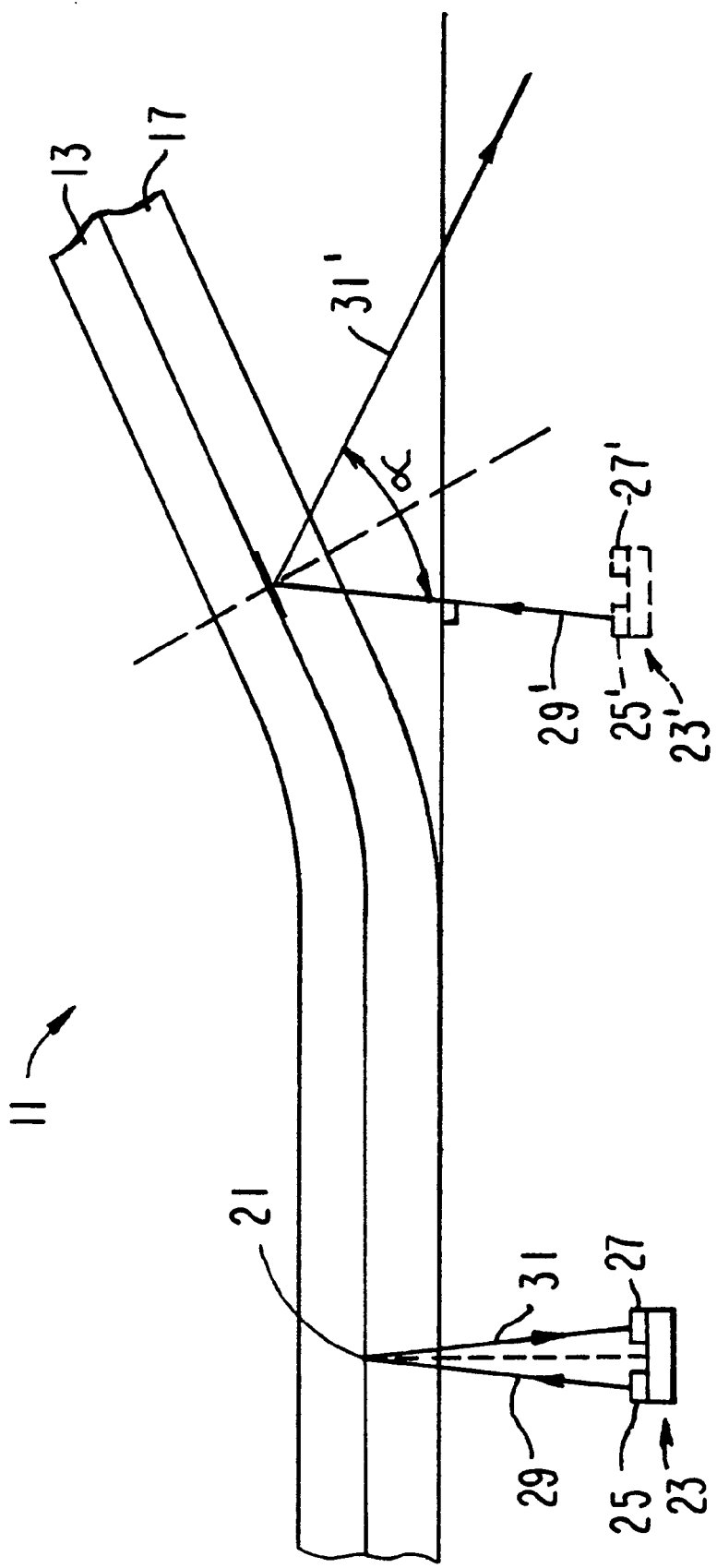
FIG. 2 is a cross-sectional view of a DVD formed via one-sided exposure.

In order to understand how the present invention improves the bonding of structurally asymmetrical or otherwise structurally dissimilar optical discs, it is first necessary to understand the shortcomings of conventional optical disc bonding techniques. These shortcomings are discussed with reference to FIGS. 1A–1C and FIG. 2.

FIG. 1A shows a DVD 11 formed using a conventional simultaneous exposure technique. DVD 11 contains an image disc 13 (containing a graphical image 15) bonded to a program information disc 17 with a light-curable bonding material 19. Program information disc 17 contains program information 21 in a form similar to the format shown by Kramer U.S. Pat. No. 5,068,846. Graphical image 15 contains pit art (see, for example, U.S. Pat. No. 5,729,533, issued Mar. 17, 1998), enhanced pit art (see, for example, U.S. patent application Ser. No. 08/714,302, filed Sep. 18, 1996), generic or specific artwork (see, for example, U.S. Pat. No. 5,766,495, issued Jun. 16, 1998), holographic artwork, printed labels, printed images, silk screening, or the like. FIG. 1B shows a top view of DVD 11 (and image disc 13) wherein graphical image 15 is represented by the word GRAPHICS.

As shown in FIG. 1A, during a simultaneous exposure, light-curable bonding material 19 is cured by simultaneously shining light through both the front side of image disc 13 and the front side of program information disc 17. As a consequence of spatial variations in the transmissivity of image disc 13 (e.g., due to variations in ink thickness, color, etc. of graphical image 15), light-curable bonding material 19 cures non-uniformly and in a manner related to the spatial transmissivity variations of graphical image 15. This non-uniform curing produces a mirror image 15' of graphical image 15 which is visible through program information disc 17 as shown in FIG. 1C. That is, image pass-through of the graphical image 15 results from the simultaneous exposure of DVD 11.

To avoid image pass-through, DVD 11 can be cured by performing a one-sided exposure through program information disc 17. During a one-sided exposure, bonding material 19 is exposed to an ultraviolet light source located on the program information side of DVD 11. By only exposing bonding material 19 through program information disc 17, bonding material 19 is unaffected by the spatial transmissivity variations of graphical image 15. Bonding material 19 therefore cures independently of graphical image 15, and image pass-through is eliminated.

While a one-sided exposure eliminates the non-uniform curing of bonding material 19 (due to the spatial transmissivity variations of graphical image 15) responsible for image pass-through, the one-sided exposure produces an alternate form of non-uniform bonding material curing. During a one-sided exposure, bonding material proximate program information disc 17 (e.g., near the light source used to expose bonding material 19) cures more rapidly than bonding material near graphical image 15. Because bonding material 19 expands during curing, bonding material proximate program information disc 17 expands more rapidly than bonding material near graphical image 15. To relieve the strain produced by the non-uniform expansion of the bonding material 19, DVD 11 warps as shown in FIG. 2. When DVD 11 warps, much of program information 21 is no longer readable (as described below).

With reference to FIG. 2, program information 21 of DVD 11 is read (i.e., the DVD 11 is "played") via an optical pick-up 23. Optical pick-up 23 contains a laser source 25, a detector 27, and various optical and digital signal processing components (not shown) for maintaining the focus of a transmitted laser beam 29 (emitted by laser source 25) on program information 21. To read program information 21, laser source 25 emits and directs transmitted laser beam 29 (focused via optical pick-up 23) toward program information disc 17. Transmitted laser beam 29 travels through program information disc 17, strikes program information 21, and generates a reflected laser beam 31 which is modulated by the surface features of program information 21.

When optical pick-up 23 reads a planar portion of DVD 11 (e.g., a non-warped portion), reflected laser beam 31 reflects toward and is detected by detector 27 as shown in FIG. 2. Detector 27 provides information to optical pick-up 23 regarding the intensity of the detected reflected laser beam 31. Optical pick-up 23 interprets this information, and extracts program information 21 therefrom.

FIG. 2 also shows an optical pick-up 23' in phantom (identical to optical pick-up 23) disposed beneath the warped portion of DVD 11. Optical pick-up 23' contains a laser source 25', a detector 27', and various optical and digital signal processing components (not shown) for maintaining the focus of a transmitted laser beam 29' on program information 21. As with optical pick-up 23, to read program information 21, laser source 25' emits and directs transmitted laser beam 29' toward program information 21. Transmitted laser beam 29' travels through program information disc 17, strikes program information 21, and generates a reflected laser beam 31'. As with reflected laser beam 31, reflected laser beam 31' is modulated by the surface features of program information 21.

Unlike reflected laser beam 31, reflected laser beam 31' does not reflect toward the detector 27'. Rather, because transmitted laser beam 29' strikes a warped portion of DVD 11, reflected laser beam 31' reflects away from detector 27' as shown in FIG. 2. Detector 27' fails to detect reflected laser beam 31' such that optical pick-up 23' is unable to read program information 21 from the warped portion of DVD 11. Thus, because DVD 11 is warped, all program information 21 located on the warped portion of DVD 11 is unreadable. A disc tilt angle $\alpha$ is assigned to DVD warpage and must not exceed 0.8° for the DVD to remain playable.

Accordingly, with conventional DVD bonding techniques, either disc tilt or image pass-through must be tolerated. The present invention simultaneously overcomes both problems as described below.

Figure 3:
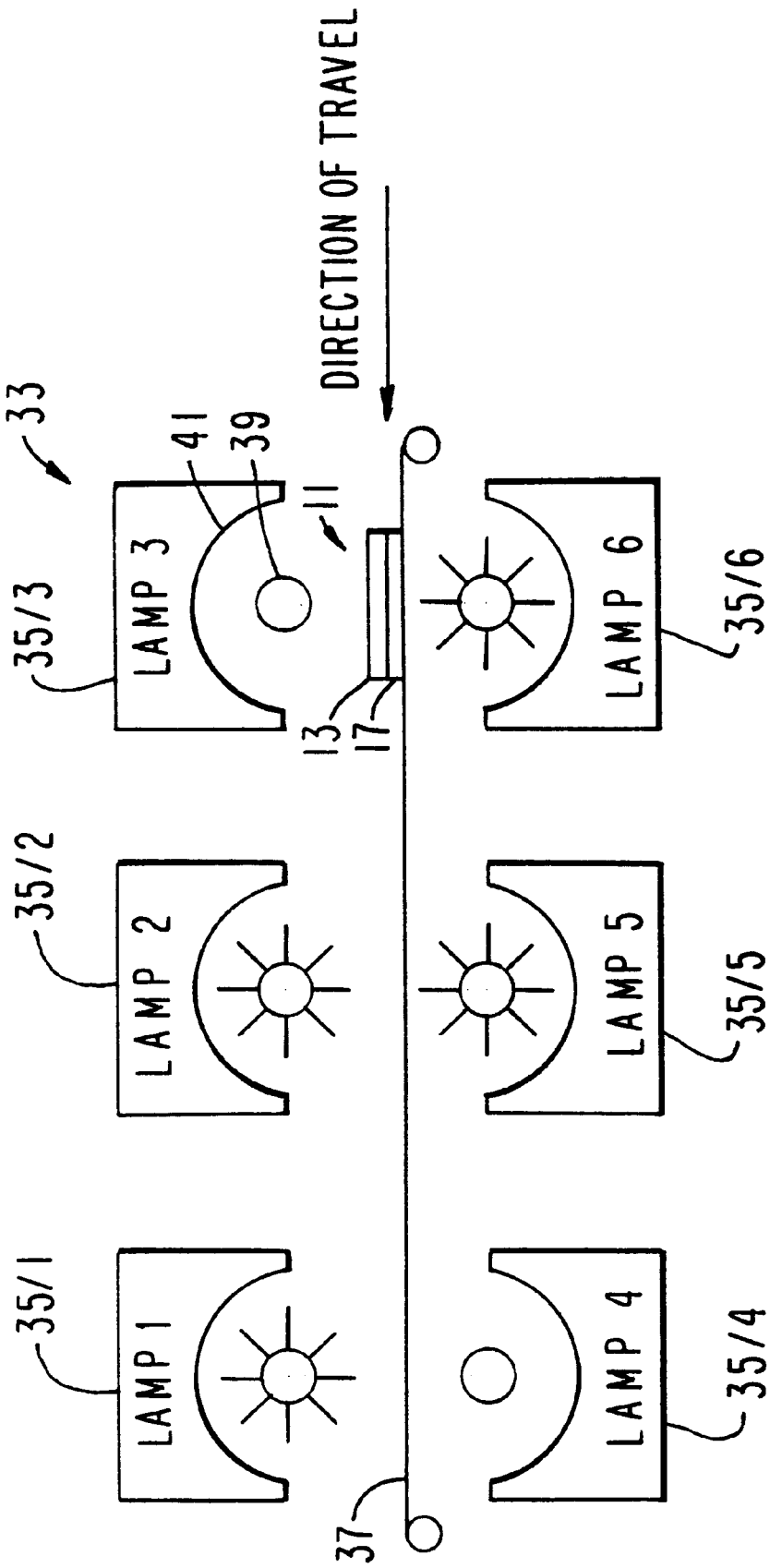
FIG. 3 is an elevational view of illustrative curing apparatus which can be operated in accordance with the present invention to produce improved asymmetrical DVDs.

FIG. 3 shows an illustrative curing apparatus 33 for curing bonding material 19 in accordance with the present invention. Curing apparatus 33 comprises an array of top lamps 35/1, 35/2, and 35/3 separated from an array of bottom lamps 35/4, 35/5, and 35/6 by a conveyor 37. Conveyor 37 is used for transporting DVD 11 through curing apparatus 33 during the curing of bonding material 19, and is sufficiently transparent to allow the DVD 11 to cure via light emitted from lamps 35/4, 35/5, and 35/6.

Each lamp 35 comprises an ultra-violet light source 39 and a reflector 41 for directing light emitted from light source 39 toward DVD 11 as shown in FIG. 3. Preferably, each lamp 35 is independently controllable.

To overcome image pass-through associated with simultaneous exposure and disc warpage associated with one-sided exposure, a hybrid simultaneous/one-sided exposure is employed. Conveyor 37 is used to move DVD 11 underneath lamp 35/3 and above lamp 35/6 and lamp 35/6 is lit for a first predetermined time period while lamp 35/3 remains extinguished. A one-sided exposure is thereby performed through program information disc 17. This exposure partially cures bonding material 19 and may cause DVD 11 to warp slightly in the direction shown in FIG. 2.

Following this first exposure, conveyor 37 moves DVD 11 beneath lamp 35/2 and above lamp 35/5. Thereafter, both lamp 35/2 and lamp 35/5 are lit for a second predetermined time period. Because bonding material 19 was partially cured by lamp 35/6, the spatial transmissivity variations inherent in graphical image 15 have a reduced impact on the curing of bonding material 19. Accordingly, image pass-through does not result during this simultaneous exposure.

Following the second exposure, conveyor 37 moves DVD 11 beneath lamp 35/1 and lamp 35/4. Lamp 35/1 is then lit for a third predetermined time period while lamp 35/4 remains extinguished. This third exposure completes the curing of bonding material 19 and reduces any disc tilt within DVD 11 (through expansion of bonding material 19 near graphical image 15) produced during the first exposure. Accordingly, both image pass-through and disc tilt are substantially reduced by employing the inventive curing method disclosed herein.

The above-described hybrid simultaneous/one-sided exposure may be employed with any DVD containing a graphical image disc and a program information disc. The particular type of graphical image (e.g., pit art, enhanced pit art, printed image, holographic artwork, etc.) will influence the first, second and third predetermined time periods for each exposure step. As an example, when DVD 11 is formed by bonding a pit art containing image disc 13 to a program information disc 17 via a bonding material 35 μm in thickness, the following exposure times and lamp intensities may be employed.

| Lamp | Power (W/cm$^2$) | Exposure Time (sec) |
| --- | --- | --- |
| 1 | 80 | 5.3 |
| 2 | 80 | 5.3 |
| 3 | 0 | — |
| 4 | 0 | — |
| 5 | 80 | 5.3 |
| 6 | 80 | 5.3 |

Note that during an exposure the light energy at the front side of image disc 13 and at the front side of program information disc 17 is approximately 0.83 Joules/cm$^2$. The light energy at bonding material 19 is approximately 1.2% of this value.

Figure 4:
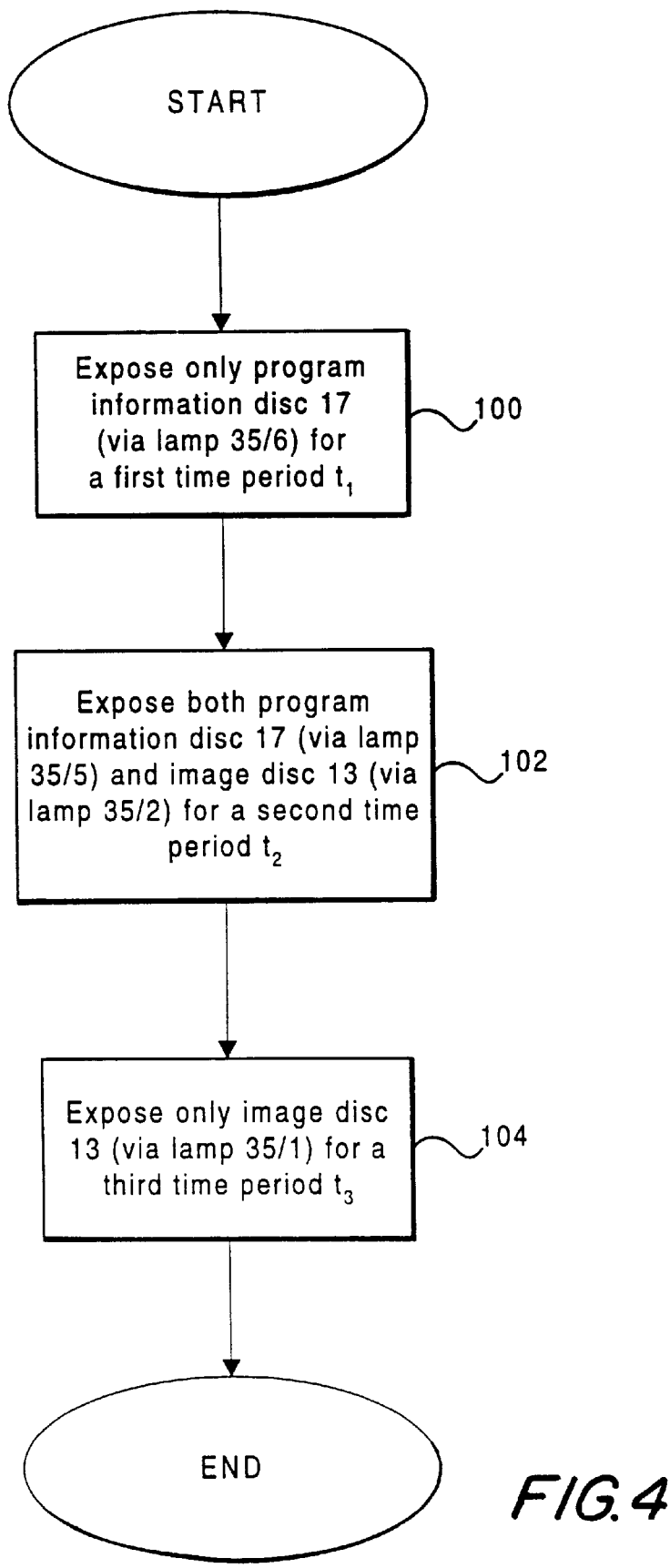
FIG. 4 is a flow chart useful in describing the operation of the curing apparatus of FIG. 3 in accordance with the present invention.

FIG. 4 shows an illustrative sequence of steps in accordance with the invention for operating the curing apparatus of FIG. 3 as described above. To some extent these steps have already been mentioned and the discussion of them here can be somewhat abbreviated.

In step 100 (subsequent to forming DVD 11 by coating at least one of the back sides of image disc 13 and program information disc 17 with bonding material 19 and stacking the discs back-to-back), DVD 11 is moved beneath lamp 35/3 and above lamp 35/6. Lamp 35/6 is then lit for a first time period $t_1$ while lamp 35/3 remains extinguished. This one-sided exposure partially cures bonding material 19 and may cause DVD 11 to warp slightly in the direction shown in FIG. 2. Step 102 then follows.

In step 102, DVD 11 is moved beneath lamp 35/2 and above lamp 35/5. Thereafter, both lamp 35/2 and lamp 35/5 are lit for a second time period $t_2$. Because bonding material 19 was partially cured by lamp 35/6, the spatial transmissivity variations inherent in graphical image 15 have a reduced impact on the curing of bonding material 19. Accordingly, image pass-through does not result during this simultaneous exposure. Step 104 then follows.

In step 104, DVD 11 is moved beneath lamp 35/1 and lamp 35/4. Lamp 35/1 is then lit for a third time period $t_3$ while lamp 35/4 remains extinguished. This third exposure completes the curing of bonding material 19 and reduces any disc tilt within DVD 11 produced during step 100. Accordingly, both image pass-through and disc tilt are substantially reduced by employing the inventive curing steps of FIG. 4.

It will be understood that the foregoing is only illustrative of the principles of this invention, and that various modifications can be made by those skilled in the art without departing from the scope and spirit of the invention. For example, by adjusting exposure parameters (e.g., wavelength or intensity) the time period for each exposure step may be widely varied. The requirement for an intermediate simultaneous exposure may even be eliminated in some cases. Furthermore, appropriate first, second, and third predetermined time periods depend on a number of other factors including bonding material thickness and curing properties, the type of disc materials employed, the type of graphical image on image disc 13, and the like. While the present invention is particularly useful for reducing image pass-through and disc tilt during asymmetrical DVD formation, it also may be employed during the formation of structurally symmetrical or otherwise structurally similar DVDs (e.g., DVDs with two program information discs) if so desired.

Curing apparatus 33 may be used for either simultaneous exposures or one-sided exposures. For instance, for a conventional simultaneous exposure, DVD 11 travels along conveyor 37 and stops beneath lamp 35/3 and above lamp 35/6. Lamps 35/3 and 35/6 are then lit so that bonding material 19 is exposed to light through both image disc 13 and program information disc 17. After a first predetermined time period, lamps 35/3 and 35/6 are extinguished and conveyor 37 moves DVD 11 beneath lamp 35/2 and above lamp 35/5. Lamps 35/2 and 35/5 are then lit so that bonding material 19 is again exposed to light through both image disc 13 and program information disc 17. After a second predetermined time period, lamps 35/2 and 35/5 are extinguished and conveyor 37 moves DVD 11 beneath lamp 35/1 and above lamp 35/4. Lamps 35/1 and 35/4 are then lit for a third predetermined time period to complete the curing of bonding material 19. For a one-sided exposure of DVD 11, the above sequence is repeated with lamps 35/3, 35/2, and 35/1 extinguished during the entire curing process.

The invention claimed is:

1. A method of bonding optical discs comprising:
   providing a first and a second optical disc, each optical disc comprising a front side and a back side;
   coating said back side of at least one of said first and second optical discs with a light-curable bonding material;
   stacking said first and second optical discs back to back to form a disc stack;
   exposing said light-curable bonding material to light by shining light through said front side of said second optical disc for a first predetermined time period;
   further exposing said light-curable bonding material to light by simultaneously shining light through both said front side of said first optical disc and said front side of said second optical disc for a second predetermined time period; and
   further exposing said light-curable bonding material to light by shining light through said front side of said first optical disc for a third predetermined time period.

2. The method defined in claim 1 wherein said second optical disc comprises program information.

3. The method defined in claim 1 wherein said first optical disc comprises at least one of program information, pit art, enhanced pit art, holographic artwork, and a printed image.

4. The method defined in claim 1 wherein said light is ultra-violet light.

5. A method of reducing disc tilt and image pass-through during the bonding of optical discs comprising:
   providing a first and a second optical disc, each optical disc comprising a front side and a back side;
   coating said back side of at least one of said first and second optical discs with a light-curable bonding material;
   stacking said first and second optical discs back to back to form a disc stack;
   warping said disc stack by shining light through said front side of said second optical disc for a first predetermined time period so as to expose said light-curable bonding material to light; and
   reducing the warpage of said disc stack by shining light through said front side of said first optical disc for a second predetermined time period so as to further expose said light-curable bonding material to light.

6. The method defined in claim 5 wherein said second optical disc comprises program information.

7. The method defined in claim 5 wherein said first optical disc comprises at least one of program information, pit art, enhanced pit art, holographic artwork, and a printed image.

8. The method defined in claim 5 wherein said light is ultra-violet light.

* * * * *